United States Patent
Dutilly et al.

(10) Patent No.: US 8,961,309 B2
(45) Date of Patent: Feb. 24, 2015

(54) SYSTEM AND METHOD FOR USING A TOUCHSCREEN AS AN INTERFACE FOR MUSIC-BASED GAMEPLAY

(75) Inventors: Derek T. Dutilly, Valencia, CA (US); Jonathan Browne, New Port Richey, FL (US); Nikolaus Paul Ingeneri, Tampa, FL (US); Shannon Richard Monroe, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 1526 days.

(21) Appl. No.: 11/745,915

(22) Filed: May 8, 2007

(65) Prior Publication Data

US 2008/0280680 A1    Nov. 13, 2008

(51) Int. Cl.
A63F 9/24      (2006.01)
A63F 13/00     (2014.01)
A63F 13/06     (2006.01)

(52) U.S. Cl.
CPC ......... *A63F 13/00* (2013.01); *A63F 2300/1068* (2013.01); *A63F 2300/1075* (2013.01); *A63F 2300/6081* (2013.01); *G10H 2220/091* (2013.01); *G10H 2220/096* (2013.01); *G10H 2220/155* (2013.01); *G10H 2220/241* (2013.01); *A63F 13/005* (2013.01); *A63F 2300/10* (2013.01); *A63F 2300/8047* (2013.01)
USPC .................................. 463/37; 463/7; 463/36

(58) Field of Classification Search
CPC . A63F 13/00; A63F 13/02; A63F 2300/8047; A63F 2300/10; A63F 2300/1068; A63F 2300/1075; A63F 2300/638; A63F 2300/6081; A63F 2300/6045; G10H 2220/135; G10H 2220/091; G10H 2220/096; G10H 2220/221; G10H 2220/231; G10H 2220/241
USPC ................................. 463/7, 30–31, 35, 36, 37
See application file for complete search history.

(56) References Cited

U.S. PATENT DOCUMENTS 5,990,405 A     11/1999  Auten et al.
2006/0287088 A1 12/2006  Mashimo
(Continued)

FOREIGN PATENT DOCUMENTS

EP         1 081 680 A1    3/2001

OTHER PUBLICATIONS

Ransom-Wiley, "Ubisoft 'Jam Sessions' turns DS into guitar"; retrieved from http://www.joystiq.com/2007/03/08/ubisoft-jam-sessions-turns-ds-into-guitar/, Mar. 8, 2007.
(Continued)

*Primary Examiner* — Werner Garner
(74) *Attorney, Agent, or Firm* — Pillsbury Winthrop Shaw Pittman LLP

(57) ABSTRACT

An interactive computerized game system including a visual display, one or more user input devices, and a processor executing software that interacts with the display and input device(s) is disclosed. The software displays images of musical targets on the visual display, the musical targets possibly corresponding to a pre-recorded source of music. At least one of the user input devices is a touchscreen arranged to simulate a portion of a musical instrument. During gameplay, the gameplayer must touch the touchscreen at the appropriate time and/or in the appropriate location in response to the displayed images of musical targets. The system provides a positive indication if the player's input matches the attributes of the displayed musical targets.

20 Claims, 3 Drawing Sheets

(56) References Cited

U.S. PATENT DOCUMENTS

| | | | |
|---|---|---|---|
| 2007/0180978 A1* | 8/2007 | Ozaki et al. | 84/602 |
| 2007/0221046 A1* | 9/2007 | Ozaki et al. | 84/612 |
| 2008/0102958 A1* | 5/2008 | Kitamura et al. | 463/42 |
| 2008/0113698 A1* | 5/2008 | Egozy | 463/7 |

OTHER PUBLICATIONS

Geiger, "Using the Touch Screen as a Controller for Portable Computer Music Instruments"; NIME 06, Jun. 4-8, Paris, France.

NDS Hiite Utaeru DS Guitar M-06; retrieved from http://www.ncsx.com/2007/012907/hiite_utaeru_ds.htm, Jan. 29, 2007.

Davies, "DS Guitar M-06 hits Japan"; retrieved from http://www.pocketgamer.co.uk, Feb. 7, 2007.

Lumb, "DS Guitar Software Coming to Japan"; retrieved from http://www.1up.com, Nov. 8, 2006.

Preview: Hiite Utaeru DS Guitar M-06 (DS):; retrieved from http://www.el33tonline.com/main/show_review/80, Dec. 15, 2006.

Harris, "E3 2006: Elite Beat Agents"; retrieved from http://ds.ign.com/articles/705/705544p1.html, May 10, 2006.

Devries, "E3 2006: The Little Mermaid DS"; retrieved from http://ds.ign.com/articles/707/707347p1.html, May 10, 2006.

Guitar Hero (series); Wikipedia; retrieved from http://en.wikipedia.org/wiki/Guitar_Hero (series), Jan. 24, 2008.

Dance Dance Revolution; Wikipedia; retrieved from http://en.wikipedia.org/wiki/Dance_Dance_Revolution, Jan. 24, 2008.

International Search Report dated Aug. 18, 2008 for PCT/US2008/061915.

* cited by examiner

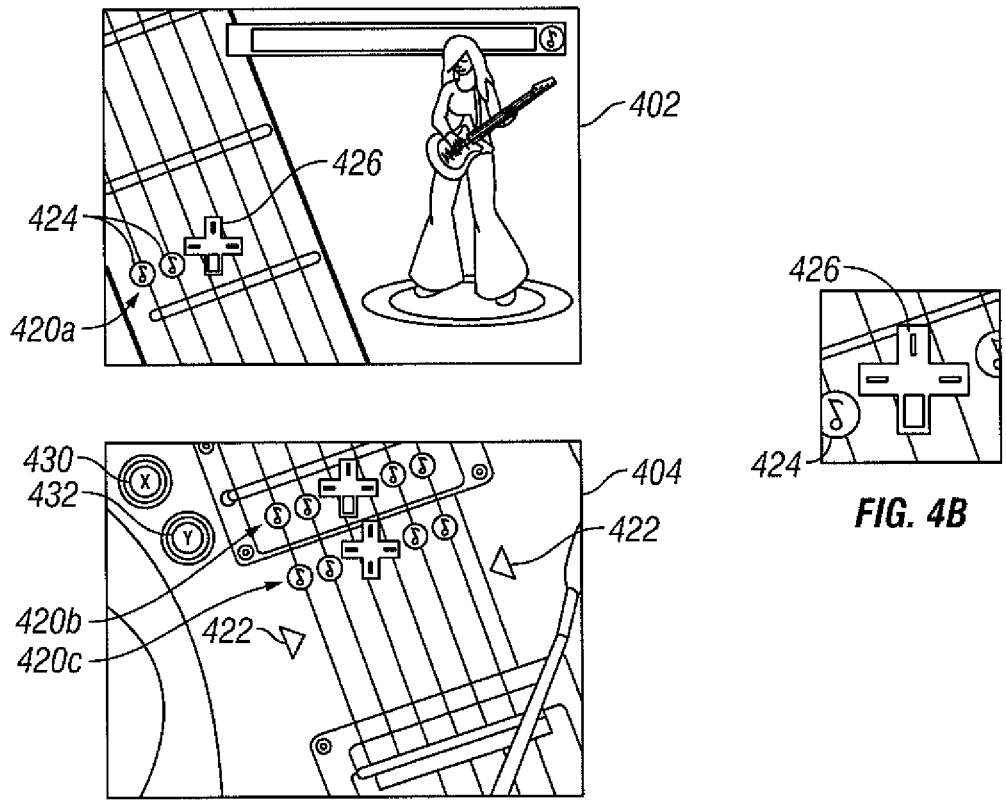
FIG. 4A
FIG. 4B
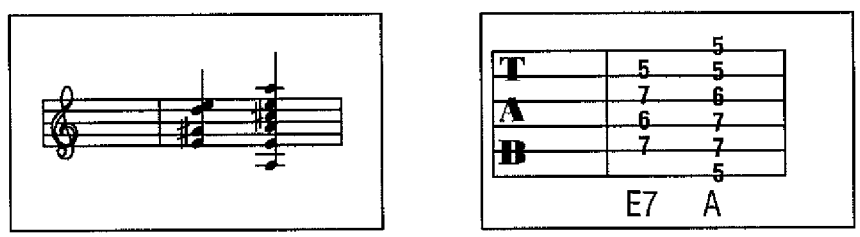
FIG. 5A  FIG. 5B

SYSTEM AND METHOD FOR USING A TOUCHSCREEN AS AN INTERFACE FOR MUSIC-BASED GAMEPLAY

BACKGROUND OF THE INVENTION

1. Field of the Invention

This application generally relates to interactive computerized game systems and, more particularly, to music video games.

2. Description of the Related Technology

In existing music video games, the gameplayer must activate buttons or keys on a game controller in time with an audio and/or visual display of music. Many games involve specialized game controllers which simulate the look or feel of a musical instrument or dance experience.

Large-scale arcade games such as Konami's "Dance Dance Revolution™," for example, involve a "dance pad" game controller with several arrow panels. Using his feet, the gameplayer must press the dance pad panels according to a series of arrow images displayed on the screen in front of him. The arrow images correlate to the beat of a chosen song, and the gameplayer's success depends on his ability to time and position his steps with the display of music.

Other music video games include specialized game controllers which simulate the look and/or feel of a musical instrument. RedOctane's "Guitar Hero", for example, includes a specialized guitar controller which is an approximately ¾ scale reproduction of an actual electric guitar. The guitar controller includes fret buttons, a strum bar, and a whammy bar. The gameplayer must hold down the correct fret button while pressing the strum bar at the appropriate time in response to a display of musical notes on the video screen.

SUMMARY OF CERTAIN INVENTIVE ASPECTS

Aspects of the present invention include an interactive computerized game system comprising a visual display and a processor executing software. The visual display includes a touchscreen portion. The visual display is configured to display an image of a musical target, the musical target having one or more attributes. The touchscreen is configured to receive user input in response to the displayed image of a musical target. The software is configured to provide a positive indication to the user if the received user input matches the attributes of the displayed image of a musical target. Inventive aspects are thus generally configured to provide an interactive, music-based gameplay experience for gameplayers, using a touchscreen to simulate one or more aspects of a musical instrument.

Other aspects include a computer readable medium having computer executable instructions stored thereon which, when executed, cause a computing device to perform a method of simulating a musical instrument. The method comprises displaying one or more musical targets, where each musical target has at least one attribute. The method also comprises receiving user input from one or more user input devices, where at least one of the user input devices comprises a touchscreen. The method further comprises providing an indication of whether the user input matches the at least one attribute of the musical target.

Still other aspects include a method of simulating a musical instrument. The method comprises displaying one or more musical targets, where each musical target has at least one attribute. The method also comprises receiving user input from one or more user input devices, where at least one of the user input devices comprises a touchscreen. The method further comprises providing an indication of whether the user input matches the at least one attribute of the musical target.

BRIEF DESCRIPTION OF THE DRAWINGS

FIG. 4A is a diagram of the visual display and touchscreen of a game system according to still another embodiment.

FIG. 4B is a close-up of an image of a musical target according to the embodiment of FIG. 4A.

FIG. 5A shows an image of a musical target according to a further embodiment of the present invention.

FIG. 5B shows an image of a musical target according to yet another embodiment.

DETAILED DESCRIPTION OF CERTAIN INVENTIVE EMBODIMENTS

Figure 1:
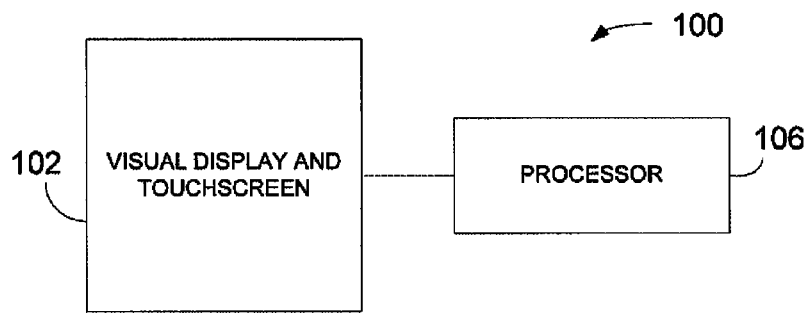
FIGS. 1-3 are block diagrams of game systems according to various embodiments.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

Various embodiments of the invention provide a system and method of music-based gameplay which is carried out using a touchscreen device to "play" a simulated instrument. Embodiments may allow players to interact with an audio and/or visual musical display in a single, compact device, without the need for a highly specialized game controller. Embodiments also may help create an experience which more closely simulates the feel of playing a musical instrument (for example, "strumming" a guitar or beating a drum) than can be created with a keyboard or joystick-type peripheral. Embodiments may further allow for creation of a musical learning experience which may be focused mainly on sightreading, chord-key relationships, rhythm, or any combination of these and other areas.

Musical Targets

Embodiments of the invention generally involve a visual display configured to display an image of a musical target for the user to play. As used in this description, the term "musical target" can refer to any element of music, such as a note, chord, or (especially in an embodiment simulating one or more percussion instruments) a beat on a particular instrument or part of an instrument. The simulated instrument may be real (such as a guitar or keyboard) or fantastical. A series of musical targets may comprise all or part of a riff, track, or song. For example, a series of musical targets may collectively comprise a lead guitar harmony, a guitar chord progression, a bass line, or a rhythm portion of a song.

A musical target comprising a single note can be portrayed as an image of that note as represented in standard musical notation, in tablature, or simply as the letter of the note's name (e.g., "A" or "F#"). Alternatively, in an embodiment simulating a stringed instrument, a note can be portrayed as an image highlighting a specific string and/or a specific location on a fretboard or neck of the instrument. In an embodiment simulating a keyboard instrument, a musical target comprising a note can be portrayed as an image highlighting a specific key.

A musical target comprising a chord can similarly be portrayed in a number of ways. A chord can be portrayed as an image of the chord as represented in standard musical notation, in tablature, or simply as the chord symbol (e.g., "A," "Amaj," or "C#min"). Alternatively, in an embodiment simulating a stringed instrument, a chord can be portrayed as an image highlighting specific strings and/or specific locations on a fretboard or neck of the instrument. In an embodiment simulating a keyboard instrument, a musical target comprising a note can be portrayed as an image highlighting a specific set of keys. Similarly, a musical target comprising a beat can appear as an image of the beat as portrayed in standard percussion notation, or as highlighted portions of displayed images of percussion instruments.

An image of a musical target may additionally comprise an image of a user input device along with an indication of a specific user input corresponding to the target. Such an image may comprise, for example, an image of a directional pad (D-pad) with a particular leg of the D-pad highlighted (or with no legs highlighted) to indicate the appropriate input to the user. Where an image of a musical target comprises musical notation, tablature, or other symbols, without an image of a user input device (see FIGS. 5A and 5B) the visual display may include a separate representation of the user input device providing a mapping between user input and a selection of musical target choices.

A musical target may also be a moving target. Where an image of a musical target comprises musical notation or tablature, for example, a moving target may scroll across a visual display of ledger lines. Where an image of a musical target comprises an image of a user input device, a moving target may scroll across or down a visual display. In an embodiment simulating a string instrument such as a guitar, such a target may move down the neck of the instrument toward the sound hole (or pickups, in the case of an electric guitar).

A musical target may have one or more attributes. Such attributes may include, for example, tonality, location, and timing. A tonality attribute may correspond to the tone or pitch of a musical target such as a note or a chord. A timing attribute may correspond to the proper timing of a musical target within the context of a musical track or riff. A timing attribute may be represented by standard musical notation or tablature, or simply by appearance of (or highlighting of) an image of a musical target. A timing attribute may also be indicated by the location of a moving target. For example, in an embodiment simulating a guitar, the proper timing of a musical target may be indicated by the target reaching the sound hole (or pickups, in the case of an electric guitar). A location attribute may correspond to a location on a simulated instrument. In an embodiment simulating a guitar, a location attribute may correspond to a particular string or set of strings on which the musical target must be "played." In an embodiment simulating a drum set, a location attribute may correspond to the center of a particular drum or the edge of a particular cymbal.

A Basic System

With reference now to FIG. 1, a block diagram illustrates an exemplary system for playing a video game such as, e.g., a game machine. Another platform for gameplay could be a television set with internal or external software application execution capability. The device 100 generally includes a visual display 102 connected to a processor 106. At least a portion of the visual display 102 is a touchscreen. The visual display 102 may be configured to display an image of a musical target (described in detail above). The touchscreen portion of the visual display 102 may be configured to receive user input in response to the displayed image of a musical target. The touchscreen may, for example, be configured to appear as a musical instrument or a portion of a musical instrument such as a guitar, bass guitar, piano, or drum set. For example, the touchscreen portion may include a display of one or more strings of a guitar or bass guitar, a section (such as the section near the sound hole) of a guitar or bass guitar, a portion (such as a bass or treble portion) of a piano keyboard, or a subset of a drum set (including, for example, a bass drum, a snare, and a cymbal, or portions thereof). The processor 106 may execute software configured to provide a positive indication to the user if the received user input matches the attributes of the musical target. The positive indication may comprise generating a sound corresponding to the musical target. The positive indication may also comprise a visual indication of a correct match. In an embodiment simulating a guitar, for example, the positive indication may comprise a moving image simulating vibration of the string or strings that were "played." The positive indication may further comprise additional audio or visual signals (such as stars or "thumbs-up" symbols) indicating a correct match.

Figure 2:
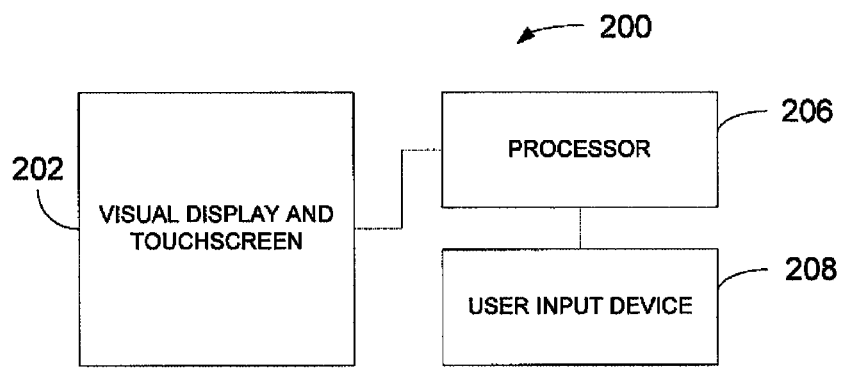

FIG. 2 illustrates an alternative embodiment, in which a device 200 includes a visual display 202, a processor 206, and at least one user input device 208. At least a portion of the visual display 202 is a touchscreen. The user input device 208 may comprise any device suitable for receiving user input, for example, a button or set of buttons, a keypad, or a directional pad ("D-pad"). The user input device 208 may be configured to control a selection of musical target choices. In an embodiment including a D-pad input device, for example, each leg of the D-pad may be configured to select a particular chord (or note) out of a set of four chord (or note) options, with a default selection of a fifth chord (or note) when none of the legs is depressed.

Figure 3:
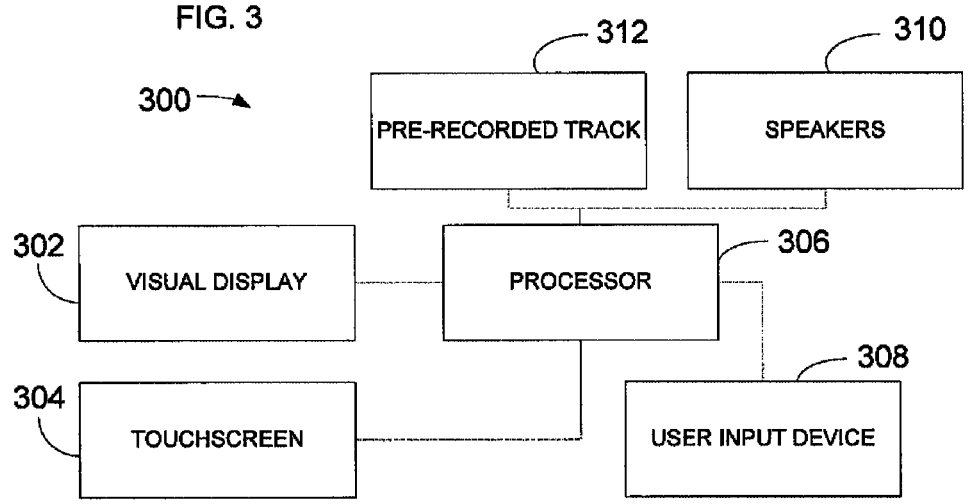

Embodiments of the invention may include a visual display having two or more visually separate portions. As illustrated in FIG. 3, a device 300 may include a visual display having a non-touchscreen portion 302 and a visually separate touchscreen portion 304. The device 300 may further include speakers 310 and a source 312 of a music track. The music track may be pre-recorded (as indicated in FIG. 3) and pre-selected, or may be dynamically generated. The source 312 may comprise any digital music format, such as a MIDI file, for example.

FIGS. 4A and 4B illustrates a visual display of an embodiment as used in a game designed for a portable game machine such as the Nintendo DS™. This embodiment provides a simulated guitar-based gameplay experience in a portion of the overall game accessed via a command menu. The visual display has a non-touchscreen portion 402 and a touchscreen portion 404. As can be seen in the figure, the non-touchscreen portion 402 shows a portion of the neck of a guitar, along with an image of a musical target 420(a). The touchscreen portion 404 shows a portion of the body of a guitar along with images of musical targets 420(b) and 420(c). Each of the musical targets 420(a)-(c) corresponds to a chord element of a—music track. In the illustrated embodiment, the track may be part of a theme song for a television series or movie. The touchscreen portion 404 includes arrows 422 which indicate the region of the touchscreen 404 that a user touches in order to "play" the simulated instrument. The musical targets 420(a)-(c) may include one or more flags 424 which highlight the string or strings a user touches on the touchscreen portion 404 in order to "play" the target. Together, the arrows 422 and flags 424 may define a location attribute of a given musical target.

As can best be seen in FIG. 5, the musical targets 420(a)-(c) each include a representation 426 of a D-pad user input device (not shown in the figure). Each leg of the D-pad user input device corresponds to one of a selection of chords that form part of the song. The representations 426 may include an image indicating which (if any) leg of the D-pad a user must depress while simultaneously interacting with the touchscreen in order to "play" the correct chord of the song. The representations 426 therefore may help define a tonality attribute of a given musical target.

In the illustrated embodiment, the musical targets 420(a)-(c) appear first on the non-touchscreen portion 402 of the visual display, and then move down the neck of the simulated guitar and onto the touchscreen portion 404. The appropriate timing of each of the musical targets 420(a)-(c) may be indicated when the target reaches the area between the arrows 422.

Also displayed in the touchscreen portion 404 are images of buttons 430 and 432, which may be used, for example, to activate or deactivate a sound effect such as distortion. Buttons 430 and 432 may correspond to additional user input devices (not shown in the figure).

Gameplay

Figure 6:
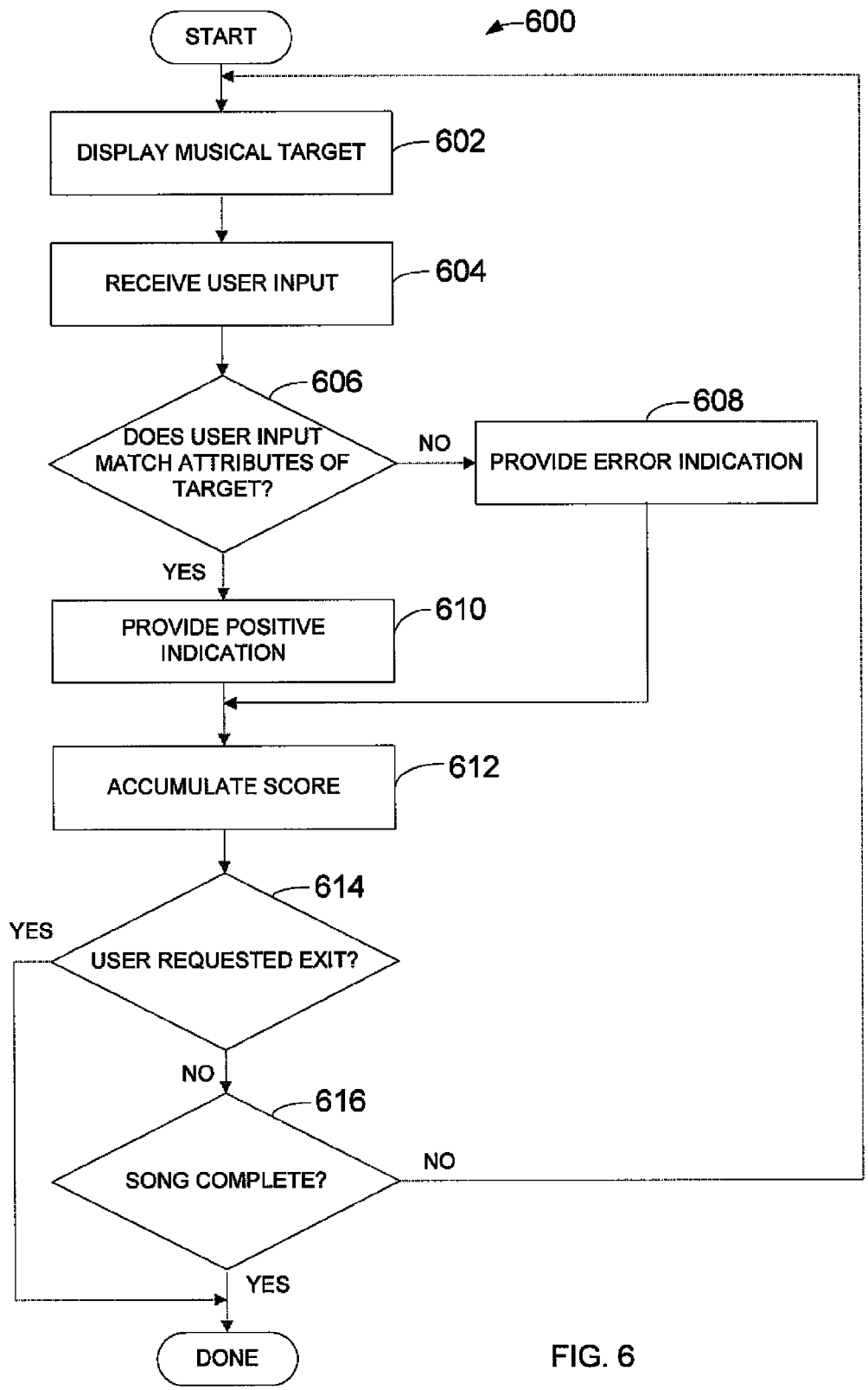
FIG. 6 is a flow diagram of an embodiment of a game process.

FIG. 6 illustrates a basic gameplay process 600 according to an embodiment of the invention. Throughout gameplay, the process may play background music of a music track or song (see FIG. 3). At block 602, an image of a musical target is displayed. The musical target may have one or more attributes, such as a tonality, location, and/or timing attribute. The musical target may correspond to an element (such as a note, chord, or beat) of—a part of the music track, such as a lead guitar harmony, a guitar chord progression, a bass line, or a rhythm portion of the track. At block 604, user input is received. The user input can comprise input to a touchscreen, as well as input to one or more additional user input devices. Touchscreen input can be achieved with a stylus, with an adapted stylus in the form of a pick or drumstick, or with a finger. At block 606, the user input is evaluated against the attributes of the musical target displayed at block 602. In the embodiment illustrated in FIGS. 4A and 4B, for example, the user must contact the touchscreen generally between the arrows 422 across at least those strings highlighted by flags 424 in order to match the location attribute of each of the targets 420(a)-(c). In order to match the timing attribute of one of the targets 420(a)-(c), the user must contact the touchscreen when the target scrolls through the region between the arrows 422. In order to match the tonality attribute of each of the targets 420(a)-(c), the user must depress the leg of the D-pad which is highlighted (if any) in the target.

Referring again to FIG. 6, if the user input matches the attributes of the displayed target, the process moves to block 610 and a positive indication is provided to the user. The positive indication may comprise, for example, generating a sound corresponding to the musical target. The positive indication may further include displaying an image indicating a successful "hit" to the user. As shown at block 608, the process 600 may also provide an error indication to the user if no user input is received or it the user input does not match the attributes of the displayed target. The error indication may comprise silence, or may comprise generating a sound indicative of an error. The error indication may further comprise generating a visual symbol indicative of an error, such as an "X" or "thumbs-down" image.

As can be seen in the figure, the process 600 may further include accumulating the user's score at block 612. At block 614, if the user has requested exit from the process 600, the process may end. If not, the process may move to block 616 and determine whether a song (or track or riff) has completed or not. If a song is complete, the process 600 may end. If not, the process 600 may be repeated a number of times with a series of musical targets. For example, in the embodiment illustrated in FIGS. 4A and 4B, a series of musical targets may appear on the non-touchscreen portion 402 of the visual display and scroll down the visual display into the touchscreen portion 404. Each of the targets 420(a)-(c) may correspond to a chord of the track or riff to be played, and the targets may be separated by spaces matching the rhythm of the track or riff being played. If the user input successfully matches the attributes of each musical target, the system will generate sounds corresponding to the track. Thus, these and other embodiments of the invention allow a user to "play" a song or track by successfully matching a series of displayed musical targets.

It will be understood that numerous and various modifications can be made from those previously described embodiments and that the forms of the invention described herein are illustrative only and are not intended to limit the scope of the invention.

What is claimed is:

1. An interactive computerized game system comprising:
   a visual display configured to display a musical target moving from a first location to at least a target region, at least a portion of the visual display including the target region comprising a touchscreen;
   a user input device comprising one or more interface elements that are configured to be manually depressed by a user; and
   a processor executing software configured to:
      detect contact by the user with the target region;
      determine whether the one or more interface elements have been depressed; and
      responsive to a detection that the user initiated contact with the target region while the musical target scrolls through the target region, effectuate generation of a sound corresponding to the musical target and the depression of the one or more interface elements while the musical target was scrolling through the target region.

2. The system of claim 1, wherein the visual display comprises a plurality of visually separate portions.

3. The system of claim 1, wherein the portion of the visual display including the target region is configured to present a view of at least a portion of a simulated instrument.

4. The system of claim 3, wherein the simulated instrument is a guitar.

5. The system of claim 1, wherein the processor is configured such that the sound includes a chord specified by the depression of the one or more interface elements while the musical target was scrolling through the target region.

6. The system of claim 1, wherein the displayed musical target comprises a representation of at least one of the one or more interface elements.

7. The system of claim 1, wherein the displayed musical target comprises a chord fingering.

8. The system of claim 1, wherein the displayed musical target comprises musical notation.

9. The system of claim 1, further comprising a source of a music track, wherein the generated sound is a musical element of the music track.

10. The system of claim 1, wherein the processor is configured such that the sound includes a note specified by the depression of the one or more interface elements while the musical target was scrolling through the target region.

11. The system of claim 1, wherein detecting contact by the user with the target region indicates a location the user has tapped the touchscreen.

12. The system of claim 1, wherein detecting contact by the user with the target region is indicative of a location the user has dragged a stylus across a portion of the touchscreen.

13. The system of claim 1, wherein the user input device is a directional pad, and wherein the one or more interface elements include a plurality of legs respectively associated with a plurality of directions, and wherein determining the depression of the one or more interface elements includes determining one of the plurality of directions selected through the directional pad.

14. A non-transitory computer readable medium having computer executable instructions stored thereon which, when executed, cause a computing device to perform a method of simulating a musical instrument, the method comprising:
 (a) displaying a musical target moving from a first location to at least a target region, at least a portion of a visual display including the target region comprising a touchscreen;
 (b) determining whether an input device comprising one or more interface elements that are configured to be manually depressed by a user are depressed or not;
 (c) indicating contact with the touchscreen by the user with the target region of the touchscreen;
 (d) responsive to the musical target scrolling through the target region, determining whether the user has contacted the target region while the musical target was scrolling through the target region based on a contact with the target region of the touchscreen by the user; and
 (e) responsive to a determination that the user has contacted the target region while the musical target was scrolling through the target region, generating a sound corresponding to the musical target and a depression of the one or more interface elements while the musical target was scrolling through the target region.

15. The computer readable medium of claim 14, wherein the musical instrument comprises a guitar.

16. The computer readable medium of claim 14, wherein the method further comprises repeating steps (a) through (e) a plurality of times and scoring a result.

17. A method of simulating a musical instrument, the method comprising:
 (a) displaying a musical target moving from a first location to at least a target region, at least a portion of a visual display including the target region comprising a touchscreen;
 (b) determining whether an input device comprising one or more interface elements that are configured to be manually depressed by a user are depressed or not;
 (c) indicating contact by the user with the target region;
 (d) responsive to the musical target scrolling through the target region, determining whether the user has contacted the target region while the musical target was scrolling through the target region based on a contact with the target region of the touchscreen by the user; and
 (e) responsive to a determination that the user has contacted the target region while the musical target was scrolling through the target region, generating a sound corresponding to the musical target and a depression of the one or more interface elements while the musical target was scrolling through the target region.

18. The method of claim 17, wherein the musical target corresponds to an element of a music track.

19. The method of claim 18, further comprising (f) generating background music corresponding to the music track.

20. The method of claim 17, further comprising repeating steps (a) through (e) a plurality of times and scoring a result.

* * * * *